C. CARSON.
TRACTOR ATTACHMENT FOR AUTOMOBILES.
APPLICATION FILED MAY 5, 1917.
1,333,963.
Patented Mar. 16, 1920.
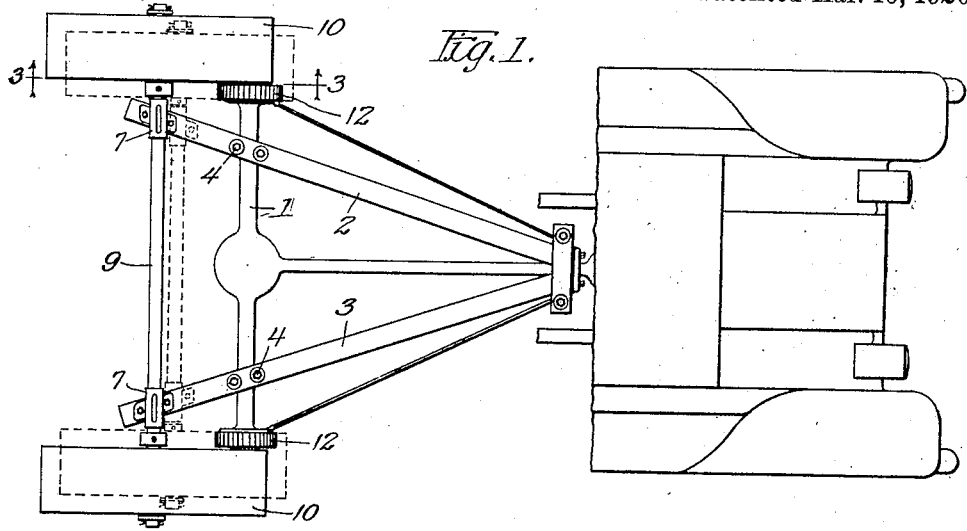
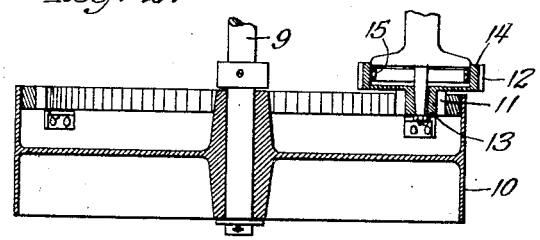
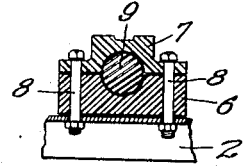
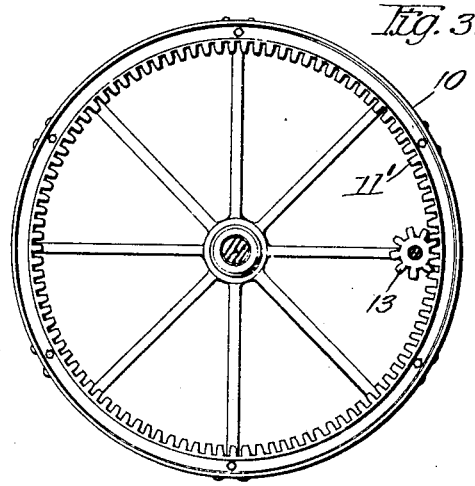
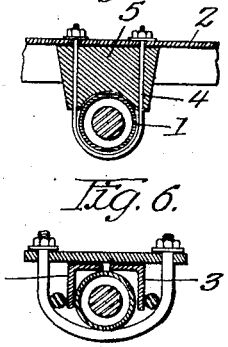
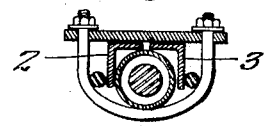
Clark Carson INVENTOR
BY *Wallace R. Carson*
ATTORNEY

UNITED STATES PATENT OFFICE.

CLARK CARSON, OF DAVENPORT, IOWA.

TRACTOR ATTACHMENT FOR AUTOMOBILES.

1,333,963. Specification of Letters Patent. Patented Mar. 16, 1920.

Application filed May 5, 1917. Serial No. 166,726.

*To all whom it may concern:*

Be it known that I, CLARK CARSON, a citizen of the United States, residing at Davenport, in the county of Scott and State of Iowa, have invented certain new and useful Improvements in Tractor Attachments for Automobiles, of which the following is a specification.

This invention relates to improvements in tractor attachments for automobiles, particularly designed to convert an automobile into a tractor so that the automobile in addition to serving its intended purpose may be made to serve as a tractor.
It is an object of my invention to provide an improved tractor attachment of this class which can be readily and quickly attached to the automobile.

It is a further object of my invention to provide a device of this class so designed that it can be readily attached without in any way connecting with the frame of the body of the automobile.

It is a further object of my invention to provide a device of this class so designed that it can be easily and readily adjusted for varying the speed thereof.

The above and other features of novelty, advantages and capabilities will become apparent from a detailed description of the accompanying drawings in which I have illustrated one form of my invention, but the construction there shown is to be understood as illustrative only and not as defining the limits of my invention.

Figure 1 is a plan view of an attachment embodying one form of my invention showing it applied to a Ford automobile, part of the automobile body being broken away and having the rear wheels thereof removed.

Fig. 2 is an enlarged cross sectional view of the tractor wheel and the gearing for driving said wheel.

Fig. 3 is a sectional view taken from line 3—3 of Fig. 1.

Fig. 4 is a sectional view of the means for securing the axle of the tractor to the supplemental frame.

Fig. 5 is a sectional view of the means for securing the frame to the axle casing of the automobile.

Fig. 6 is a sectional view of the means for securing the forward end of the frame to the universal joint casting.
Referring to the drawings in detail, 1 represents the casing of the rear axle of a Ford car upon which is mounted a pair of angle irons 2 and 3 by means of the U-shaped clamps 4, (see Fig. 5) which clamps are secured in place by means of the nuts shown. To afford a proper connection with the casing, a pair of blocks 5 are positioned between the angle irons and casing, which blocks are provided with openings through which the clamps pass, and at their lower sides with a semi-cylindrical bearing to fit tightly over the casing. The angle irons 2 and 3 extend forwardly and inwardly from the axle and are connected together at their inner ends to the universal joint casting as shown in Fig. 6. The angle irons 2 and 3 extend backwardly over the casing of the rear axle of the automobile and are provided near their outer ends with two pairs of openings, (see Fig. 1.)

Mounted on the angle irons 2 and 3 and back of the rear axle by means of the bearing 6, clamps 7 and bolts 8, is a tractor axle 9, which axle is mounted on the tractor wheels 10, which wheels are provided with internal gears 11', designed to mesh with a pair of differential gears mounted on the rear axle of the automobile in place of the automobile wheels, in a manner to rotate therewith. Each differential gear has two sets of cogs 11 and 12, cogs 11 being integrally formed with the hub 13, and cogs 12 integrally formed with the annulus 14. The inner surface of the annulus 14 coöperates with the internal expanding brake 15, which brake is of the usual well known construction and need not be described. By providing the differential gears shown, not only can varying speeds be imparted to the tractor attachment, but by having the brake cooperate with the inner surface of the annulus the tractor attachment may be brought to a sudden stop when desired.

By placing the angle irons 2 and 3 over the casing of the rear axle the axle is prevented from "climbing up" by the action of the differential gear on the gear of the tractor wheels, and by connecting the frame to the universal joint casting or propeller shaft casing, with no connections to the body of the automobile the racking and twisting strains of the automobile are not imparted to the tractor attachment and the springs supporting the rear portion of the body of the automobile are free to operate in the manner intended.

When the tractor attachment is in the position shown in heavy lines, Fig. 1, the gears on the tractor wheels are in mesh with the small cogs 11 on the differential gear. This is the position the attachment occupies when it is desired to move at a slow rate of speed. When it is desired to increase the speed of the tractor the gears on the tractor wheels can be moved so as to mesh with the cogs 12 in the differential gear by simply removing the bolts 8 from angle irons 2 and 3, slide the attachment forwardly and the tractor wheels inwardly to the position shown in dotted lines, Fig. 1.

When it is desired to use the automobile for its intended purposes, all that is necessary is to remove the tractor wheels, the shaft, and the differential gears and substitute the automobile wheels.

From the construction shown and described it will readily be seen that I have provided an attachment which is compact in form, out of the way, can be readily attached, can be carried permanently if desired without interfering in any way with the intended purposes of the automobile, by simply removing the tractor wheels and shaft, and does not in any way connect with the frame of the body of the automobile.

Having thus described my invention, I claim:—

1. In a tractor attachment for motor vehicles, a frame comprising two frame members, adapted to be positioned above the rear axle of a motor vehicle, and connected at the forward end to the universal casting of a motor vehicle, independently of the body of said vehicle, with their opposite ends extending rearwardly from the axle of said motor vehicle, and provided with means near their ends for mounting an auxiliary shaft or axle, said means on said members near their outer ends permitting horizontal adjustment of said auxiliary shaft or axle to vary the gear ratio, and geared tractor wheels mounted on said shaft or axle, in combination with a pair of gears mounted on each end of the driving axle of an automobile and adapted when the auxiliary axle is shifted forwardly or rearwardly and the geared tractor wheels shifted inwardly or outwardly to coöperate with the said geared tractor wheels to furnish different gear ratios for driving the vehicle.

2. In a tractor attachment for motor vehicles, a frame comprising two frame members adapted to be positioned above the rear axle of a motor vehicle and connected at the forward end to the universal casting of a motor vehicle independently of the body of said vehicle, with their opposite ends extending rearwardly from the axle of said motor vehicle and provided with means near their ends for mounting an auxiliary shaft or axle, said means on said members near their outer ends permitting horizontal adjustment of said auxiliary shaft or axle to vary the gear ratio, and gears mounted on said auxiliary shaft or axle in combination with a pair of gears mounted on each end of the driving axle and adapted, when the auxiliary axle is shifted forwardly or rearwardly and the gears thereon shifted inwardly or outwardly to coöperate with the said first-named gears to furnish different gear ratios for driving the vehicle.

In witness whereof, I hereunto subscribe my name to this specification in the presence of two witnesses.

CLARK CARSON.

Witnesses:
 ALBERT W. HAMANN,
 V. E. BRAMMER.